(12) United States Patent
Horsager et al.

(10) Patent No.: US 9,815,569 B2
(45) Date of Patent: Nov. 14, 2017

(54) SYSTEM AND METHOD FOR REAL-TIME AIRCRAFT PERFORMANCE MONITORING

(71) Applicant: Rosemount Aerospace Inc., Burnsville, MN (US)

(72) Inventors: Thomas J. Horsager, Burnsville, MN (US); Michael Haukom, Burnsville, MN (US); William Baumgarten, Burnsville, MN (US); Matthew J. Hansen, Burnsville, MN (US); Kenneth J. Freeman, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 15/234,390

(22) Filed: Aug. 11, 2016

(65) Prior Publication Data

US 2016/0349745 A1 Dec. 1, 2016

Related U.S. Application Data

(63) Continuation of application No. 13/753,017, filed on Jan. 29, 2013, now Pat. No. 9,567,097.

(60) Provisional application No. 61/594,761, filed on Feb. 3, 2012.

(51) Int. Cl.
*G05D 1/00* (2006.01)
*B64D 45/00* (2006.01)
*G07C 5/08* (2006.01)
*G01F 9/00* (2006.01)

(52) U.S. Cl.
CPC ............ *B64D 45/00* (2013.01); *G01F 9/008* (2013.01); *G05D 1/0005* (2013.01); *G07C 5/085* (2013.01)

(58) Field of Classification Search
None
See application file for complete search history.

(56) References Cited

U.S. PATENT DOCUMENTS

| 4,110,605 A | 8/1978 | Miller |
| 4,277,041 A * | 7/1981 | Marrs ................ G05D 1/0638 244/182 |
| 4,494,210 A | 1/1985 | Miller |

(Continued)

FOREIGN PATENT DOCUMENTS

WO  WO-2004013785 A2  2/2004

OTHER PUBLICATIONS

Search Report in counterpart European Application No. 13153928, dated May 29, 2013, 2 pages.

(Continued)

*Primary Examiner* — Jean-Paul Cass
(74) *Attorney, Agent, or Firm* — Locke Lord LLP; Scott D. Wofsy; Christopher J. Cillié

(57) ABSTRACT

A computer apparatus and method to determine aircraft fuel mileage performance. The computer apparatus including a memory and a processor disposed in communication with the memory and configured to issue a plurality of instructions stored in the memory. The instructions issue signals to receive real-time aircraft data during aircraft flight and process the real-time data to determine real-time aircraft mass data. A calculation is performed to determine the real-time fuel mileage performance for the aircraft based upon determined real-time aircraft mass data.

18 Claims, 2 Drawing Sheets

(56) References Cited

U.S. PATENT DOCUMENTS

| | | | | |
|---|---|---|---|---|
| 4,590,475 | A * | 5/1986 | Brown | G05D 1/0607 244/76 R |
| 6,134,500 | A * | 10/2000 | Tang | G05D 1/0005 701/10 |
| 6,334,344 | B1 * | 1/2002 | Bonhoure | G05D 1/101 244/190 |
| 7,702,427 | B1 * | 4/2010 | Sridhar | G08G 5/045 701/14 |
| 8,290,696 | B1 * | 10/2012 | Sridhar | G08G 5/045 701/1 |
| 8,509,968 | B1 * | 8/2013 | Saccone | G05B 13/0205 244/12.1 |
| 2001/0056316 | A1 * | 12/2001 | Johnson | G01C 5/005 701/14 |
| 2003/0176954 | A1 * | 9/2003 | Jaw | F01D 21/003 701/3 |
| 2004/0254693 | A1 | 12/2004 | Parsons et al. | |
| 2007/0032921 | A1 * | 2/2007 | Allen | G01C 23/005 701/3 |
| 2010/0076624 | A1 * | 3/2010 | Hinnant, Jr. | G01C 21/165 701/4 |
| 2010/0076672 | A1 * | 3/2010 | Cremers | G06Q 10/04 701/123 |
| 2010/0332054 | A1 * | 12/2010 | Brandao | G08G 5/0013 701/3 |
| 2011/0118908 | A1 * | 5/2011 | Boorman | G08G 5/0021 701/14 |
| 2012/0078450 | A1 * | 3/2012 | Marche | G01C 23/005 701/6 |
| 2012/0206597 | A1 * | 8/2012 | Komoto | G06T 7/215 348/135 |
| 2012/0218127 | A1 * | 8/2012 | Kroen | G08G 5/0034 340/945 |
| 2013/0204469 | A1 * | 8/2013 | Horsager | G01F 9/008 701/3 |
| 2015/0279218 | A1 * | 10/2015 | Irrgang | G08G 5/0039 701/3 |
| 2016/0086396 | A1 * | 3/2016 | Nutaro | G07C 5/0808 701/29.4 |

OTHER PUBLICATIONS

Examination Report in counterpart European Application No. 13153928, dated May 29, 2013, 3 pages.
Examination Report in Chinese Application No. 2013100419792 dated Feb. 22, 2016.
European Search Report for corresponding European Application Ser. No. 13153928, dated May 29, 2013, 2 pages.
Written Opinion for corresponding European Application Ser. No. 13153928, dated May 29, 2013, 3 pages.
First Office Action in corresponding Chinese Application No. 2013100419792 dated Feb. 22, 2016.
Chinese Office Action dated Nov. 1, 2016 with English Translation.

* cited by examiner

SYSTEM AND METHOD FOR REAL-TIME AIRCRAFT PERFORMANCE MONITORING

CROSS REFERENCE TO RELATED APPLICATIONS

This application is a continuation of U.S. patent application Ser. No. 13/753,017, filed Jan. 29, 2013, which claims priority to U.S. Patent Application Ser. No. 61/594,761 filed Feb. 3, 2012, the contents of which are incorporated herein by reference in their entireties.

FIELD OF THE INVENTION

The present invention relates to a system and method for real-time aircraft performance monitoring, and more particularly, to optimizing fuel mileage performance.

BACKGROUND OF THE INVENTION

Fuel usage is one of the major operating costs for the airline industry and, accordingly, optimizing fuel mileage performance, i.e., fuel efficiency, is a priority. Fuel efficiency can be increased during manufacture of new aircraft and include more efficient engine design, lighter design materials and improved aerodynamics, however, for aircraft that currently exist, increasing fuel efficiency has proven difficult.

Existing aircraft, using conventional techniques to increase fuel efficiency, typically fly in specified flight envelopes that depend on an aircraft's current gross weight or mass, environmental data and performance parameters, e.g., speed and altitude. Specifically, pilots adjust the aircraft's altitude and cruise speed as the mass decreases due to fuel consumption which, in turn, optimizes fuel efficiency. Optimal cruise speeds are determined according to cost schedules derived from fuel efficiency. The cost schedules have a cost index that is calculated by airlines, and balances time and fuel costs. For example, as fuel costs increase, the cost index decreases and results in lower, i.e., slower, optimal cruise speeds.

However, conventional techniques that calculate fuel mileage performance are often inaccurate due to inaccurate calculations of mass variations and environmental data assumptions. For example, flight crews typically derive a pre-flight mass for an aircraft from combinations of actual and estimated mass. This pre-flight mass is entered into a flight computer that adjusts the flight profile according to pre-programmed algorithms, which can account for weight variations, due to fuel consumption during flight. However, these pre-programmed algorithms rely upon statistical models that often result in variances between calculated and actual conditions, including mass and environmental conditions.

Other conventional techniques that attempt to calculate fuel mileage performance occur post-flight. For example, some airlines manually track fuel consumed at the end of each flight. However, this approach fails to assist optimizing fuel efficiency during flight since it only measures fuel mileage performance post-flight.

Clearly, there is a need in the art for improved systems and methods that increase fuel efficiency for aircraft, via real-time aircraft performance monitoring. Moreover, there is a need to more accurately determine the mass using real-time aircraft performance monitoring, in turn, increases fuel mileage performance, e.g., fuel efficiency. Further still, there is a need to more accurately monitor other factors, in real-time, which effect fuel mileage performance, e.g., environmental conditions.

SUMMARY OF THE INVENTION

The purpose and advantages of the invention will be set forth in and apparent from the description that follows. Additional advantages of the invention will be realized and attained by the apparatus, systems and methods particularly pointed out in the written description and claims hereof, as well as from the appended drawings.

To achieve these and other advantages and in accordance with the purpose of the invention, as embodied, the invention includes, in one aspect, a computer apparatus and method to determine aircraft fuel mileage performance in which an aspect of the invention includes receiving real-time aircraft data during aircraft flight and processing the real-time data to determine real-time aircraft mass data. A calculation is performed to determine the real-time fuel mileage performance for the aircraft based upon the determined real-time aircraft mass data.

Further aspects of the invention include transmitting an alert signal that indicates degradation of said fuel mileage performance when said fuel mileage performance is below a predetermined threshold. Another aspect includes adjusting the altitude and a cruise speed of the aircraft based upon the calculated real-time fuel mileage performance. Other aspects include storing the fuel mileage performance as a record in a database having previously stored records and calculating a performance trend for the fuel mileage performance based on the record and at least one of the previously stored records. Additional aspects include determining a degradation of fuel mileage performance according to the calculated performance trend and performing maintenance on the aircraft when the degradation of fuel mileage performance falls below a predetermined threshold.

BRIEF DESCRIPTION OF THE DRAWINGS

So that those having ordinary skill in the art, to which the present invention pertains, will more readily understand how to employ the novel system and methods of the present invention, embodiments thereof will be described in detail herein-below with reference to the drawings, wherein.

DETAILED DESCRIPTION OF CERTAIN EMBODIMENTS

Figure 1:
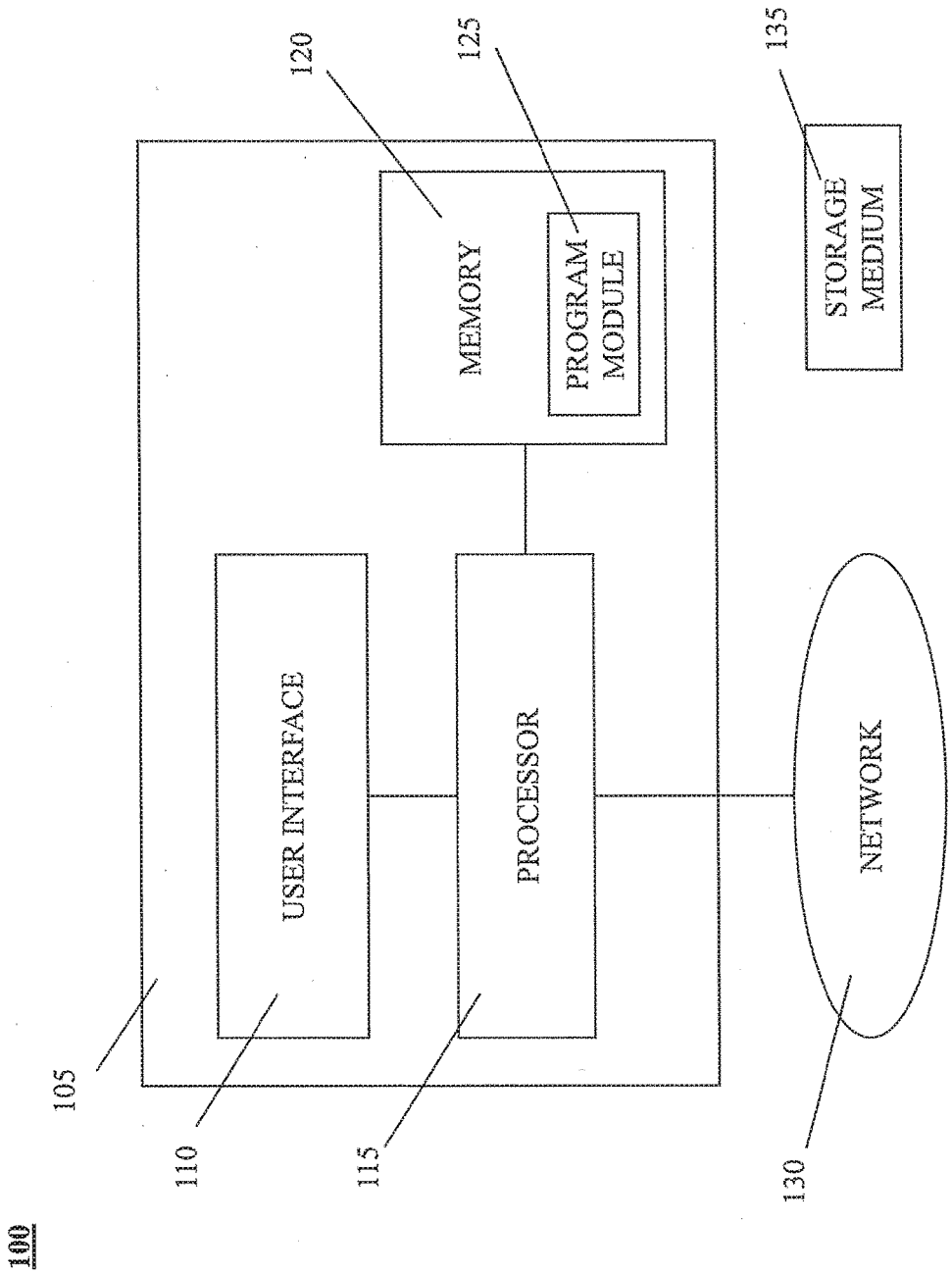
FIG. 1 is a system diagram for executing methods of real-time aircraft performance monitoring.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

With reference to the below illustrated embodiments, the present invention is directed to systems and methods for real-time aircraft performance monitoring. More particularly, the subject invention is directed to determining a real-time aircraft mass and determining performance parameters based on the real-time aircraft mass.

Real-time aircraft performance monitoring enables pilots to make more accurate and effective decisions that maximize aircraft performance and optimize an aircraft flight profile. These decisions include adjusting an aircraft's altitude and cruise speed. For example, an autopilot system or a pilot can initiate a step climb to a higher altitude for improved fuel mileage performance based on a real-time mass that accounts for weight decreases due to fuel burn over time. In addition, the cruise speed of the aircraft can be adjusted according to more accurate cost schedules that are derived, in part, from real-time mass calculations. The cost schedules can further be derived from real-time assessment of fuel mileage performance factors.

Referring to the FIGS, and in particular FIG. 1, there is provided a diagram of a system, i.e., system 100, for real-time aircraft performance monitoring. System 100 preferably includes a computer 105 coupled to a network 130, e.g., the aircraft digital busses and/or aircraft radio networks. Computer 105 preferably includes a user interface 110, a processor 115, and a memory 120. Although computer 105 is represented herein as a standalone device, it is not limited to such, but instead can be coupled to other devices (not shown) in a distributed processing system.

User interface 110 preferably includes an input device, such as a keyboard, a touch screen or a speech recognition subsystem, which enables the pilot to communicate information and command selections to processor 115. User interface 110 also includes an output device such as a display, e.g., a heads up display or a multi-function display. User interface 110 can further include an input device such as a mouse, track-ball, or joy stick, which allows the pilot to manipulate the display for communicating additional information and command selections to processor 115.

Processor 115 is preferably an electronic device configured of logic circuitry that responds to and executes instructions. Memory 120 is preferably a computer-readable medium encoded with a computer program. In this regard, memory 120 stores data and instructions that are readable and executable by processor 115 for controlling the operation of processor 115. Memory 120 may be implemented in a random access memory (RAM), a hard drive, a read only memory (ROM), or a combination thereof. One of the components of memory 120 is a program module 125.

Program module 125 contains instructions for controlling processor 115 to execute the methods described herein. For example, under control of program module 125, processor 115 performs the processes described for the processor of the EFB-above. It is to be appreciated that the term "module" is used herein to denote a functional operation that may be embodied either as a stand-alone component or as an integrated configuration of a plurality of sub-ordinate components. Thus, program module 125 may be implemented as a single module or as a plurality of modules that operate in cooperation with one another. Moreover, although program module 125 is described herein as being installed in memory 120, and therefore being implemented in software, it could be implemented in any of hardware (e.g., electronic circuitry), firmware, software, or a combination thereof.

Processor 115 outputs, to user interface 110, a result of an execution of the methods described herein. Alternatively, processor 115 could direct the output to a remote device (not shown), e.g., refer to a flight operations center 225 in FIG. 2, via network 130. It is also to be appreciated that while program module 125 is indicated as already loaded into memory 120, it may be configured on a storage medium 135 for subsequent loading into memory 120. Storage medium 135 is also a computer-readable medium encoded with a computer program, and can be any conventional storage medium that stores program module 125 thereon in tangible form. Examples of storage medium 135 include a floppy disk, a compact disk, a magnetic tape, a read only memory, an optical storage media, universal serial bus (USB) flash drive, a solid state storage (SSD), a compact flash card, or a digital versatile disc. Alternatively, storage medium 135 can be a random access memory, or other type of electronic storage, located on a remote storage system and coupled to computer 105 via network 130.

It is further to be appreciated that although the systems and methods described herein can be implemented in software, they could be implemented in any of hardware (e.g., electronic circuitry), firmware, software, or a combination thereof.

In the illustrated embodiments, a method for real-time aircraft performance is provided. In particular, the method includes the steps of receiving real-time data during from an aircraft having sensors during aircraft flight, processing the real-time data to calculate mass data, and calculating a fuel mileage performance based on the mass data. It is to be understood real-time data is to encompass any data relating to attributes and performance of an aircraft at a given measurement time. For instance, real-time data includes (and is not limited to): aircraft laden weight, thrust, drag, lift, speed, altitude, and atmospheric conditions the aircraft is travelling though.

The method can further include transmitting an alert that indicates degradation of the fuel mileage performance, transmitting the fuel mileage performance to a cockpit of an aircraft, and automatically adjusting altitude and a cruise speed of the aircraft based on measured fuel mileage performance, for instance when a threshold fuel mileage performance is exceeded.

Figure 2:
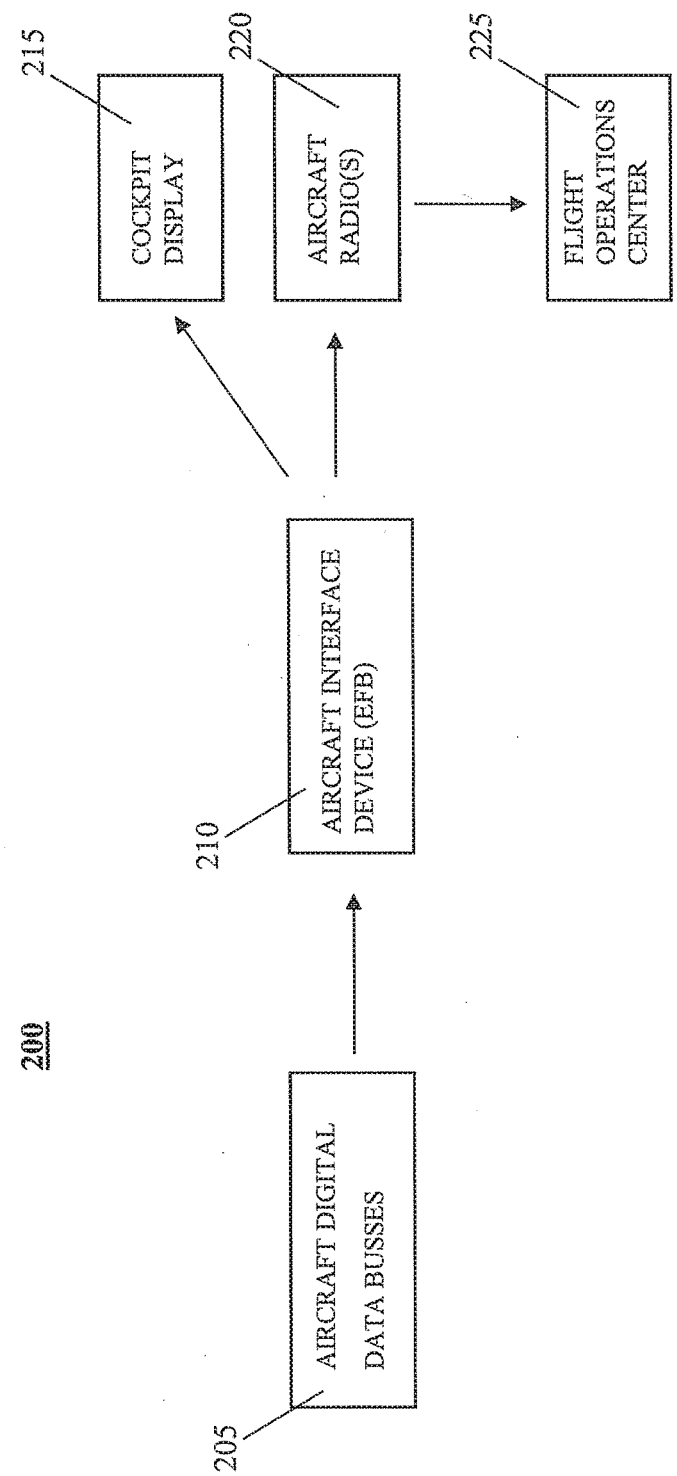
FIG. 2 is a block diagram in accordance with an illustrated embodiment.

In some embodiments, the method includes storing the fuel mileage performance as a record in a database having previously stored records, and calculating a performance trend based on the record and at least one of the previously stored records. FIG. 2 illustrates a system diagram, i.e., system diagram 200, for real-time aircraft performance monitoring. Typically, system 200 employs all, or part of, system 100 according to the present invention.

System 200 includes aircraft digital data busses 205, an aircraft interface device 210, a cockpit display 215, an aircraft radio 220, and a flight operations center 225. Aircraft digital busses 205 relay real-time sensor data to aircraft interface device 210. Aircraft interface device 210 is preferably part of an electronic flight bag system (EFB). The aircraft interface device 210 receives and processes the real-time sensor data and yields processed data relating to aircraft performance. Subsequently, the aircraft interface device typically transmits the processed data to cockpit display 215 (which can also be part of the EFB system), aircraft radio(s), e.g., ACARS and broadband, and flight operations center 225, e.g., ground stations, via the aircraft radios.

Preferably, the EFB includes a processor, and a memory having instructions that are executable by the processor, e.g., processor 115. For example, the instructions, when read by the processor can cause the processor to receive real-time data during aircraft flight, and process the real-time data to calculate fuel mileage performance factors such as aircraft mass data. The processor can further communicate with, and receive real-time data from, various aircraft sensors, e.g., inertial sensors, pitot sensors, and position sensors, via aircraft digital data busses 205. Moreover, the processor can calculate a fuel mileage performance based on the mass data, and transmit an indication of this fuel mileage performance from the EFB, e.g., aircraft interface device 210, to cockpit display 215, aircraft radio 220 or flight operations center 225 (via aircraft radio 220). In addition, the aircraft, in response to the fuel mileage performance can adjust an altitude or a cruise speed either by manual pilot input or auto-pilot controls. Further, in some embodiments, the processor communicates with a database. The processor stores fuel mileage data in a record of the database. Through a compilation of stored records, the processor generates performance trend data. Further still, the processor generates and transmits an alert that indicates degradation of the fuel mileage performance. This alert can be transmitted to cockpit display 215, aircraft radio 220 or flight operations center 225.

The subject invention facilitates maximization of fuel efficiency of aircraft via real-time data. Maximizing fuel efficiency translates to a reduction of cost. In addition, calculating and tracking performance trends of aircraft facilitates advanced monitoring of an aircraft's health and can provide an indication of required maintenance.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves.

The present disclosure is intended to embrace all such alternatives, modifications and variances that fall within the scope of the appended claims. Although the systems and methods of the subject invention have been descried with respect to the embodiments disclosed above, those skilled in the art will readily appreciate that changes and modifications may be made thereto without departing from the spirit and scope of the subject invention as defined by the appended claims.

What is claimed is:

1. A system for controlling an aircraft, comprising:
   aircraft sensors;
   an aircraft interface device comprising an electronic flight bag (EFB) disposed in communication with the aircraft sensors, the EFB including:
      a memory;
      a display; and
      a processor disposed in communication with said memory and display, said memory having instructions stored therein that, when read by said processor, cause the processor to:
         receive real-time aircraft data from the aircraft sensors during aircraft flight;
         process said real-time aircraft data to determine real-time aircraft mass data that accounts for weight decrease due to fuel burn over time;
         calculate a real-time fuel mileage performance for the aircraft based upon determined aircraft mass data and at least one parameter selected from a group of parameters including an environmental parameter and a performance parameter including speed data, altitude data, temperature data, pressure data, and angle of attack data,
         wherein the real-time data comprises aircraft laden weight, thrust, drag, lift, speed, altitude, and atmospheric conditions that an aircraft is traveling through; and
         transmit the real-time fuel mileage performance to said display of the EFB.

2. The system of claim 1, wherein said aircraft sensors transmit real-time data to said processor.

3. The system of claim 1, wherein said real-time data is selected from a group consisting of: drag, lift, speed and altitude.

4. The system of claim 3, wherein said instructions stored in memory further causes said processor to transmit an alert signal that indicates degradation of a fuel mileage performance.

5. The system of claim 3, wherein said instructions stored in memory further causes said processor to transmit said fuel mileage performance to a cockpit of an aircraft.

6. The system of claim 3, further comprising an aircraft having an altitude and a cruise speed, wherein said aircraft adjusts said altitude and said cruise speed based on said fuel mileage performance.

7. The system of claim 3, wherein said processor calculates said fuel mileage performance based on said aircraft mass data, said system further comprising:
a database having records, and
wherein said memory further causes said processor to store said fuel mileage performance data as one record of said records in said database, and compare at least said one record to at least one previously stored record to yield performance trend data.

8. A computer implemented method, comprising:
receiving real-time data from aircraft sensors during aircraft flight at an electronic flight bag (EFB);
processing in a computer processor said real-time data to determine real-time aircraft mass data that accounts for weight decrease due to fuel burn over time;
calculating real-time fuel mileage performance of the aircraft based on said determined aircraft mass data and at least one parameter selected from a group of parameters including an environmental parameter and a performance parameter including speed data, altitude data, temperature data, pressure data, and angle of attack data,
wherein the real-time data comprises aircraft laden weight, thrust, drag, lift, speed, altitude, and atmospheric conditions that an aircraft is traveling through; and
transmit the real-time fuel mileage performance to a display of the EFB.

9. The method of claim 8, further comprising transmitting an alert signal that indicates degradation of said fuel mileage performance when said fuel mileage performance is below a predetermined threshold.

10. The method of claim 8, further comprising transmitting a signal indicative of said fuel mileage performance to a cockpit of an aircraft.

11. The method of claim 8, further comprising adjusting an altitude and a cruise speed of said aircraft based on said calculated real-time fuel mileage performance.

12. The method of claim 8, further comprising:
storing said fuel mileage performance as a record in a database having previously stored records; and
calculating a performance trend for said fuel mileage performance based on the record and at least one of the previously stored records.

13. The method of claim 12, further comprising:
determining a degradation of fuel mileage performance according to the calculated performance trend; and
performing maintenance on the aircraft when the degradation of fuel mileage performance falls below a predetermined threshold.

14. A computer program product, comprising:
a non-transitory, machine-readable medium having instructions recorded thereon that, when read by a processor, cause the processor to:
receive real-time data from aircraft sensors during aircraft flight at an electronic flight bag (EFB);
process said real-time data to determine real-time aircraft mass data that accounts for weight decrease due to fuel burn over time;
calculate real-time fuel mileage performance of the aircraft based on said determined aircraft mass data and at least one parameter selected from a group of parameters including an environmental parameter and a performance parameter including speed data, altitude data, temperature data, pressure data, and angle of attack data,
wherein the real-time data comprises aircraft laden weight, thrust, drag, lift, speed, altitude, and atmospheric conditions that an aircraft is traveling through; and
transmit the real-time fuel mileage performance to the display of the EFB.

15. The computer program product as recited in claim 14 wherein said computer readable program code further causes the computer to transmit an alert signal that indicates degradation of said fuel mileage performance when said fuel mileage performance is below a predetermined threshold.

16. The computer program product as recited in claim 14 wherein said computer readable program code further causes the computer to adjust an altitude and a cruise speed of said aircraft based on said calculated real-time fuel mileage performance.

17. The computer program product as recited in claim 14 wherein said computer readable program code further causes the computer to:
store said fuel mileage performance as a record in a database having previously stored records; and
calculate a performance trend for said fuel mileage performance based on the record and at least one of the previously stored records.

18. The computer program product as recited in claim 14 wherein said computer readable program code further causes the computer to:
determine a degradation of fuel mileage performance according to the calculated performance trend; and
perform maintenance on the aircraft when the degradation of fuel mileage performance falls below a predetermined threshold.

* * * * *